L. R. & A. P. BOURDON.
STEERING DEVICE FOR SLEDS.
APPLICATION FILED DEC. 6, 1915.
1,242,514. Patented Oct. 9, 1917.
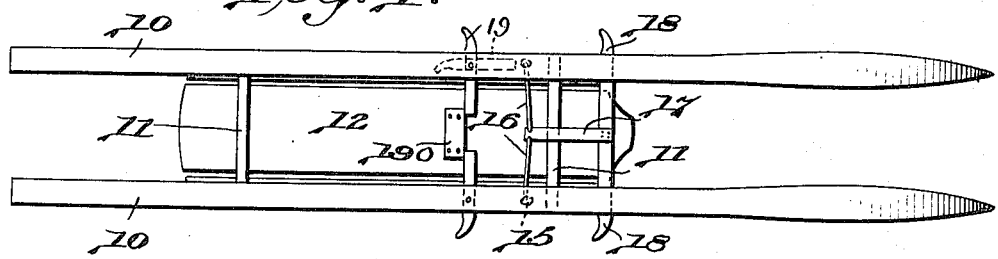
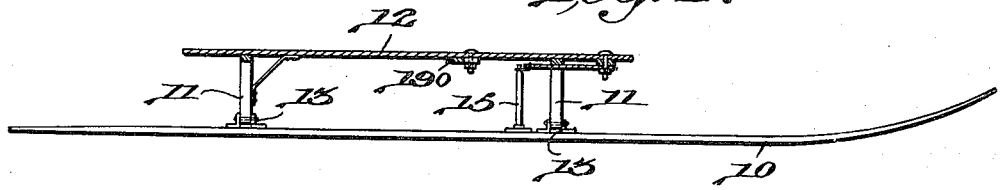
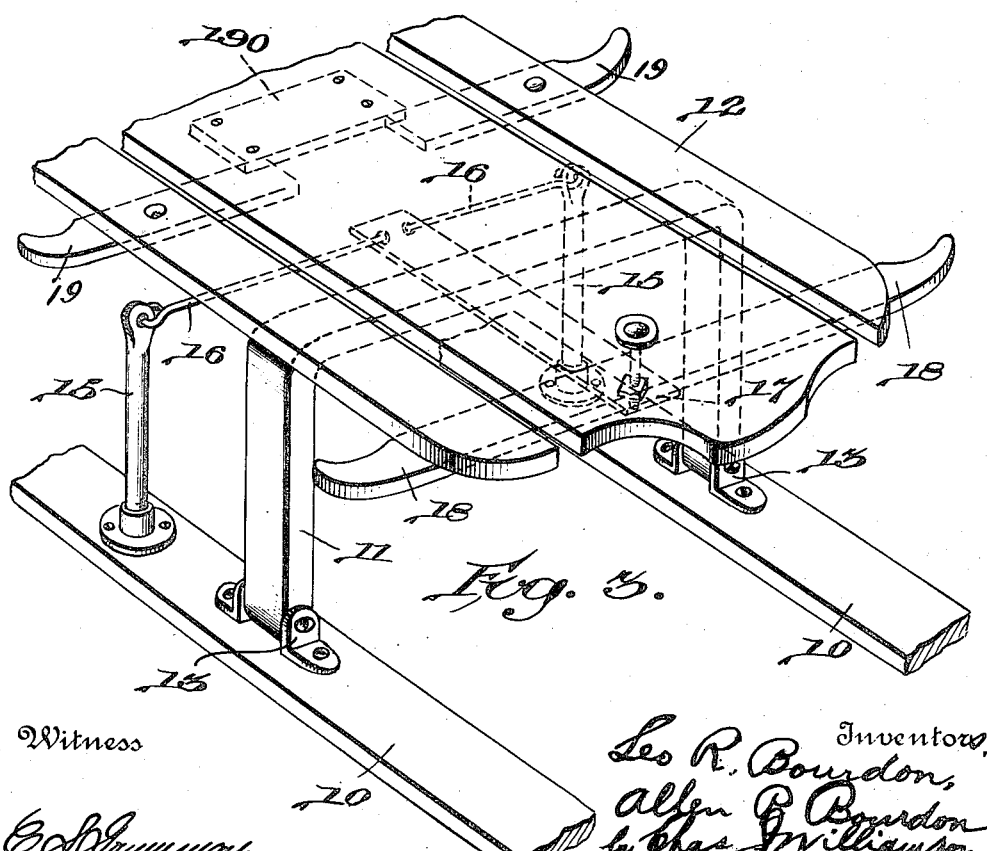

UNITED STATES PATENT OFFICE.

LEO R. BOURDON AND ALLEN P. BOURDON, OF WOODSTOCK, VERMONT, ASSIGNORS TO WOODSTOCK MANUFACTURING COMPANY, INCORPORATED.

STEERING DEVICE FOR SLEDS.

1,242,514.     Specification of Letters Patent.     Patented Oct. 9, 1917.

Application filed December 6, 1915. Serial No. 65,290.

*To all whom it may concern:*

Be it known that we, LEO R. BOURDON and ALLEN P. BOURDON, citizens of the United States, and residents of Woodstock, county of Windsor, and State of Vermont, have invented a certain new and useful Improvement in Steering Devices for Sleds; and do hereby declare that the following is a full, clear, and exact description thereof.

Our invention relates to sleds of the construction forming the subject of our patent No. 1,160,569, dated November 16, 1915, of the type having runners each in the form of a skee, and the object of our invention is to improve the construction in the interest of enabling more than one person to ride at a time, and simplifying the control, or steering mechanism, and to this end our invention consists in the construction substantially hereinafter specified and claimed.

In the accompanying drawings—

Figure 1 is a bottom plan view of a sled embodying our invention;

Fig. 2 is a longitudinal section thereof;

Fig. 3 is a detail view in perspective of the steering mechanism on a larger scale.

In making our invention we employ a pair of runners 10 of the form of a skee and preferably of the proportions of the skee, that is to say, each runner is in the form of a long broad, but comparatively thin bar that is straight throughout its length excepting at its front end where it is bent or curved upward offering at the front end of the sled, in the case of each runner, a forwardly and upwardly inclined broad snow-engaging surface. Runners thus constructed are admirably suited for deep snow, and when connected with the sled so that they may be rocked or turned on a longitudinal axis and present the upwardly and forwardly inclined ends at an angle to the snow, they constitute an easily controlled and highly efficient steering means, all as is more fully set forth hereinafter.

Each of the runners is pivotally connected on its upper side to the lower extremities of two frames 11, to which are attached the passenger support, or seat 12, the pivotal connection being by means of a hinge 13 with its axis extending parallel with the length of the runner so that the runner may be rocked, or turned on a longitudinal axis in a direction crosswise of the sled and thereby the position of the runner changed from a horizontal one to an inclined one, and the upwardly, or forwardly curved inclined front end of the runner set at an angle so that in impinging, or striking against the snow in its onward movement at an angle, the effect will be to deflect or turn the sled to the right or to the left according to the direction in which the runners are rocked on their pivotal connections with the cross bars 14. Attached to the upper side of each skee, or runner, is a post 15. Each post 15 at its upper end is connected by an inwardly extending rod, or link 16 with the rear end of a T-shaped lever 17 which is pivoted at the intersection of the stem and arms of the T to the underside of the sled seat, the arms 18 extending crosswise of the sled and projecting, respectively, beyond the sides thereof in position where they may be engaged by the feet of the rider, or his hands and thus the position of said lever controlled, or shifted for guiding, or steering purposes. Thus, when said steering lever is rocked, the skee-form-runners will be turned on their longitudinal axis.

Preferably, for the comfort of a second passenger on the sled, a foot or hand rest 19 is provided at each side of the seat in rear of the steering lever, and said rest is preferably in the form of a swinging bar so that when desired it may be swung into a position beneath the seat when it is not to be used. Each foot rest, when swung into position for use, is held there by the engagement of its inner end with a block 190 on the underside of the seat.

Having thus described our invention what we claim is—

A coasting device, comprising a frame and runners, each in the form of a skee pivotally connected to the frame on a longitudinal axis immediately adjacent each skee upon which the same may be rocked for steering, a T-shape lever consisting of a bar extending crosswise of the coasting device and protruding beyond the seat thereof at each end, and a longitudinally extending bar, a post rising from each skee, and a connection between the upper end of the posts and said lever consisting of separate links extending from the post respectively to said lever.

In testimony that we claim the foregoing we have hereunto set our hands.

LEO R. BOURDON.
ALLEN P. BOURDON.